(12) United States Patent
Zhou et al.

(10) Patent No.: US 9,258,470 B1
(45) Date of Patent: Feb. 9, 2016

(54) MULTI-APERTURE IMAGING SYSTEMS

(71) Applicant: Google Inc., Mountain View, CA (US)

(72) Inventors: Changyin Zhou, San Jose, CA (US); Roman Lewkow, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/446,751

(22) Filed: Jul. 30, 2014

(51) Int. Cl.
*H04N 5/225* (2006.01)
*H04N 5/247* (2006.01)

(52) U.S. Cl.
CPC ........... *H04N 5/2258* (2013.01); *H04N 5/2251* (2013.01); *H04N 5/247* (2013.01)

(58) Field of Classification Search
USPC .................................................. 348/335–344
See application file for complete search history.

(56) References Cited

U.S. PATENT DOCUMENTS

| | | | |
|---|---|---|---|
| 5,406,412 | A | 4/1995 | Zehnpfennig et al. |
| 5,471,346 | A | 11/1995 | Ames |
| 6,593,561 | B2 | 7/2003 | Bacarella et al. |
| 7,486,438 | B2 | 2/2009 | Bergeron et al. |
| 8,439,265 | B2 | 5/2013 | Ferren et al. |
| 8,553,117 | B2 * | 10/2013 | Cooper .......................... 348/297 |
| 8,599,301 | B2 | 12/2013 | Dowski, Jr. et al. |
| 8,953,084 | B2 | 2/2015 | Kamath |
| 2009/0102924 | A1 * | 4/2009 | Masten, Jr. ..................... 348/155 |
| 2013/0041221 | A1 * | 2/2013 | McDowall et al. ........... 600/111 |
| 2013/0242060 | A1 | 9/2013 | Brady et al. |
| 2014/0005555 | A1 | 1/2014 | Tesar |
| 2014/0267875 | A1 * | 9/2014 | Gruhlke et al. ............... 348/335 |
| 2015/0015766 | A1 * | 1/2015 | Satoh et al. ................... 348/335 |

FOREIGN PATENT DOCUMENTS

WO  2010119447 A1  10/2010

OTHER PUBLICATIONS

Non-Final Office Action mailed on Sep. 14, 2015, issued in connection with U.S. Appl. No. 14/259,919, filed Apr. 23, 2014, 11 pages.
U.S. Appl. No. 14/259,919, filed Apr. 23, 2014, 46 pages.

* cited by examiner

*Primary Examiner* — Shahbaz Nazrul
(74) *Attorney, Agent, or Firm* — McDonnell Boehnen Hulbert & Berghoff LLP

(57) ABSTRACT

An example composite imaging system includes a first imaging system further comprising a first image sensor and a first aperture anterior to the first image sensor. The first aperture (i) is defined by an inner perimeter and an outer perimeter and (ii) defines, at least in part, a field of view of the first imaging system. The first imaging system further includes a plurality of reflectors posterior to the first aperture that are configured to redirect light that crosses the first aperture to the first image sensor. The first image sensor, the first aperture, and the plurality of reflectors are arranged around a common optical axis. The composite imaging system further includes a second imaging system arranged substantially anterior to the first imaging system. The second imaging system is arranged such that the second imaging system is outside a field of view of the first imaging system.

20 Claims, 7 Drawing Sheets

MULTI-APERTURE IMAGING SYSTEMS

BACKGROUND

Unless otherwise indicated herein, the materials described in this section are not prior art to the claims in this application and are not admitted to be prior art by inclusion in this section.

Advances in computational imaging have led to interesting applications of multi-camera imaging systems. Two or more cameras may capture images of the same scene from different viewpoints and/or under different capture conditions, and computational imaging techniques may be used to form a composite image based on the two or more captured images. Such techniques include dynamic range enhancement and multi-spectrum imaging, among others. Image processing techniques may be used to overcome or alleviate parallax effects caused by the different viewpoints of the two or more cameras.

SUMMARY

Disclosed herein are multi-camera systems that are configured to reduce (and hopefully eliminate) parallax effects caused by capturing images of the same scene from different viewpoints. In particular, an example multi-camera system may be configured to simultaneously capture two or more images of the same scene from the same imaging axis (e.g., such that the centers of the fields-of-view captured in the images are aligned). For example, a first camera may be positioned behind a second camera so that both cameras can capture light originating from a common imaging axis, but the second camera does not appear in the field of view of the first camera. Such cameras can have different optical characteristics (e.g., field of view, light sensitivity, spectral response, or depth of field) while still sharing the same viewpoint, which can be advantageous for many applications.

In one example a composite imaging system is provided. The composite imaging system includes a first imaging system comprising a first image sensor and a first aperture anterior to the first image sensor. The first aperture (i) is defined by an inner perimeter and an outer perimeter and (ii) defines, at least in part, a field of view of the first imaging system. The first imaging system further includes a plurality of reflectors posterior to the first aperture that are configured to redirect light that crosses the first aperture to the first image sensor. The first image sensor, the first aperture, and the plurality of reflectors are arranged around a common optical axis. The composite imaging system further includes a second imaging system arranged substantially anterior to the first imaging system. The second imaging system includes a second image sensor and a second aperture located anterior to the second image sensor. The second aperture defines, at least in part, a field of view of the second imaging system and the second aperture and the second image sensor are arranged around the common optical axis. The second imaging system is arranged such that the second imaging system is outside a field of view of the first imaging system.

In another example, a composite imaging system is provided. The composite imaging system includes a first imaging system that further includes a first image sensor and a first aperture anterior to the first image sensor. The first aperture (i) is defined by an inner perimeter and an outer perimeter and (ii) defines, at least in part, a field of view of the first imaging system. The first imaging system further includes a first plurality of reflectors posterior to the first aperture that are configured to redirect light that crosses the first aperture to the first image sensor. The first image sensor, the first aperture, and the first plurality of reflectors are arranged around a common optical axis. The composite imaging system further includes a second imaging system arranged substantially anterior to the first imaging system that includes a second image sensor and a second aperture anterior to the second image sensor. The second aperture (i) is defined by an inner perimeter and an outer perimeter and (ii) defines, at least in part, a field of view of the second imaging system. The second imaging system further includes a second plurality of reflectors posterior to the second aperture configured to redirect light that crosses the second aperture to the second image sensor. The second image sensor, the second aperture, and the second plurality of reflectors are arranged around the common optical axis and the second imaging system is arranged such that the second imaging system is outside the field of view of the first imaging system In yet another example, the composite imaging system also includes a third imaging system arranged substantially anterior to the second imaging system. The third imaging system includes a third image sensor and a third aperture anterior to the third image sensor. The third aperture defines, at least in part, a field of view of the third imaging system. The third aperture and the third image sensor are arranged around the common optical axis and the third imaging system is arranged such that the third imaging system is outside the respective fields of view of the first and second imaging systems. The composite imaging system may also include a first passband filter having a first transmission band, the first passband filter being operably coupled to the first image sensor, a second passband filter having a second transmission band, the second passband filter being operably coupled to the second image sensor, and a third passband filter having a third transmission band, the third passband filter being operably coupled to the third image sensor. The first, second, and third transmission bands respectfully represent primary colors.

These as well as other aspects, advantages, and alternatives, will become apparent to those of ordinary skill in the art by reading the following detailed description, with reference where appropriate to the accompanying figures.

DETAILED DESCRIPTION

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed systems and methods can be arranged and combined in a wide variety of different configurations, all of which are contemplated herein.

Multi-camera systems are useful for simultaneously capturing images of the same object or scene from different viewpoints and/or under different capture conditions. But, the differing viewpoints of the cameras may cause a parallax effect where the same object appears to be at different respective positions within the fields of view of the cameras. That is, along two different lines of sight, the same object may have two different apparent positions within captured images. In addition, the object may appear to be in front of (or behind) different surroundings from each viewpoint. While a parallax effect may be advantageous in certain applications, such as stereoscopic imaging and depth extraction, the parallax effect may complicate computational imaging techniques, such as dynamic range enhancement, multi-spectrum imaging, and virtual frame rate enhancement, for instance. Because cameras of traditional multi-camera systems are not aligned on the same optical axis, they do not capture images from the same viewpoint, which may result in a parallax effect.

Disclosed herein are multi-camera systems that are configured to reduce (and hopefully eliminate) parallax. In particular, an example multi-camera system may be configured to simultaneously capture two or more images of the same scene from the same imaging axis (e.g., such that the centers of the fields-of-view captured in the images are aligned). Such cameras can have different optical characteristics (e.g., field of view, light sensitivity, spectral response, or depth of field) while still sharing the same viewpoint, which can be advantageous for the applications such as those listed above.

In some embodiments, a first camera and a second camera are aligned along an optical axis with the second camera positioned in front of the first camera. An aperture of the second camera may be positioned in front of an aperture of the first camera. Similarly, an image sensor of the first camera may be located behind an image sensor of the second camera. Light that is captured by the first camera may travel past the second camera. Although the second camera lies on the optical axis in front of the first camera, the first camera is configured to redirect light to the image sensor of the first camera after the light has passed the second camera.

Figure 1:
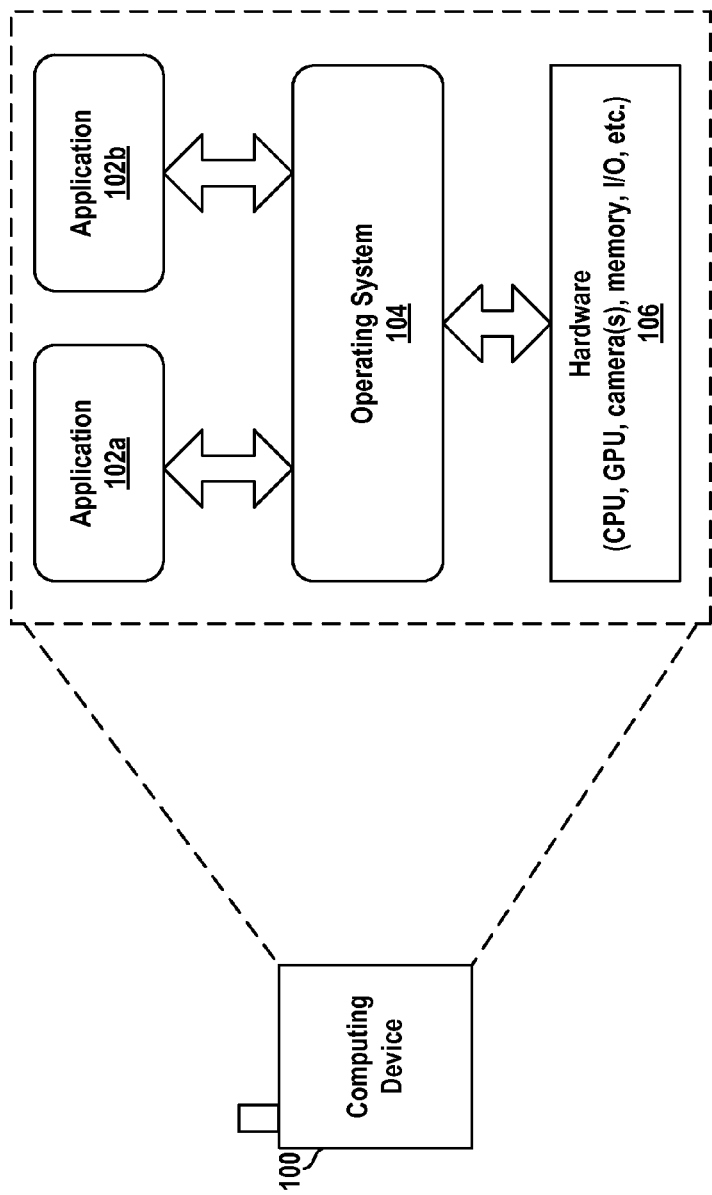
FIG. 1 illustrates an example computing device by which an example method may be implemented.

FIG. 1 illustrates an example computing device 100 by which an example method may be implemented. Computing device 100 may include applications 102a and 102b and an operating system 104 being executed by hardware 106. Aspects of this disclosure are applicable to computing devices such as PCs, laptops, tablet computers, smartphones, still-frame cameras, video cameras, real-time image viewers etc.

Each of the applications 102a and 102b may include instructions that, when executed, cause the computing device 100 to perform specific tasks or functions. Applications 102a and 102b may be native applications (i.e., installed by a manufacturer of the computing device 100 and/or a manufacturer of the operating system 104) or may be a third-party applications installed by a user of the computing device 100 after purchasing the computing device. A non-exhaustive list of example applications includes: a media player application that accepts media files as inputs and generates corresponding video and/or audio to the output device(s); an e-reader application which accepts electronic documents (books, magazines, etc.) as input and presents the content of the document via the output device(s); a feed reader that accepts feeds delivered over the Internet (e.g., RSS feeds and/or feeds from social network sites) as input and presents the feeds via the output device(s); a map application that displays a map via the output device(s); a note-taking application, a bookmarking application, and a word processing, spreadsheet, and/or presentation application that accepts specifically formatted files as inputs and presents them via the output devices for viewing and/or editing. The applications may also include a still-frame image capture application or a video camera application.

The operating system 104 may interact with and manage hardware 106 to provide services for the applications 102a and 102b. For example, an application 102a may request that the operating system 104 direct an integrated camera(s) of hardware 106 to capture a visual image and that the hardware 106 store the image to memory or display a modified image on a user display. Or, an application 102a may request that the operating system 104 direct a GPS receiver of hardware 106 to detect the geolocation of the computing device 100. In some embodiments, the computing device may include firmware instead of, or in addition to, an operating system 104. Other examples are possible.

The hardware 106 may include, for example, a central processing unit (CPU), a graphics processor (GPU), memory, an input/output (I/O) interface, a GPS receiver, image capture devices (cameras), inertial sensors, microphones, user input device(s), and output device(s). Components of hardware 106 may be controlled by instructions contained in applications 102a and 102b and operating system 104. Other examples are possible.

The central processing unit (CPU) may be operable to effectuate the operation of the computing device 100 by executing instructions stored in memory or disk storage. Such instructions may include the operating system 104 and the applications 102a and 102b. The CPU may, for example, comprise a single or multi-core processor, an application specific integrated circuit (ASIC), field programmable gate array (FPGA), and/or any other suitable circuitry.

The graphics processor may be operable to generate a video stream for output to the screen based on instructions and/or data received from the CPU. That is, data structures corresponding to images to be displayed on the screen may be stored to and read from the memory or disk storage by the CPU. The data may also be transferred directly from the integrated camera. The CPU may convey such data structures to the graphics processor via a standardized application programming interface (API) such as, for example, Standard Widget Toolkit (SWT), the DirectX Video Acceleration API, the Video Decode Acceleration Framework API, or other suitable API.

The memory may include program memory and run-time memory. The memory may, for example, comprise non-volatile memory, volatile memory, read only memory (ROM), random access memory (RAM), flash memory, magnetic storage, and/or any other suitable memory. Program memory may store instructions executable by the CPU to effectuate operation of the operating system 104 and the applications 102a and 102b. Runtime memory may store data generated or used during execution of the operating system 104 or applications 102a and 102b.

The input/output (I/O) interface may be operable to receive signals from the input device(s), and provide corresponding signals to the CPU and/or the graphics processor.

The input device(s) may include, for example, a mouse, a touchpad, a motion sensor, a trackball, a voice recognition device, a keyboard, or any other suitable input device which enables a user to interact with the computing device 100.

The output devices may include, for example, a screen and speakers. The screen may be, for example, a liquid crystal display (LCD) screen, an OLED screen, an e-ink screen, and/or any other suitable device for presenting a graphical user interface.

The computing device 100 may be used in conjunction with an imaging system as described below and shown in FIGS. 2, 3A, 3B, and 5.

Figure 2A:
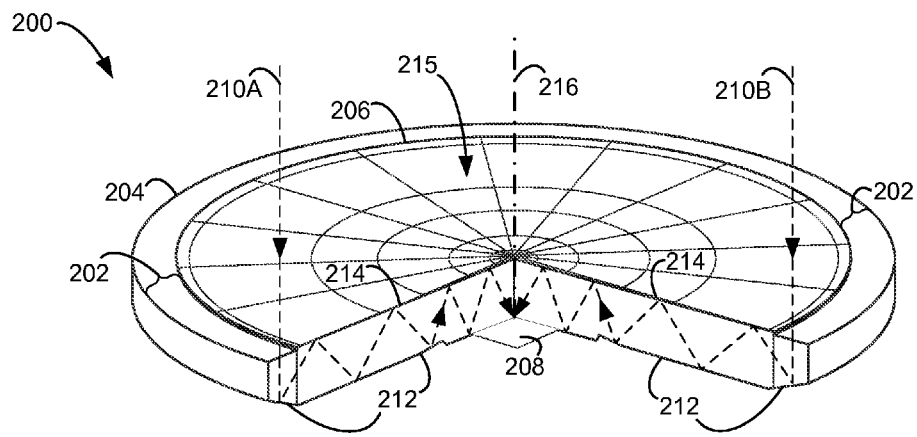
FIG. 2A illustrates a partial cross section of an example imaging system.

FIG. 2A illustrates a partial cross section of an example imaging system 200. FIG. 2A includes an aperture 202, an outer perimeter 204, an inner perimeter 206, an image sensor 208, light rays 210A and 210B, a back internal surface 212, a front internal surface 214, a front external surface 215, and an optical axis 216.

The imaging system 200 (e.g., an origami lens) may comprise a disc-shaped object made of ceramics, plastic, and/or metals, but may assume other shapes and materials as well.

The aperture 202 may have an annular or ring-like shape defined by the outer perimeter 204 and the inner perimeter 206. However, in some examples the outer perimeter 204, the inner perimeter 206, or the aperture 202 may have irregular shapes, or polygonal shapes other than a circle or a ring. The aperture 202 may be an opening in a top surface of the imaging system 200 or could otherwise include a protective transparent window that does not substantially disturb the path of light rays (such as light rays 210A and 210B) that cross the aperture 202. The aperture 202 may be defined by a ring-shaped portion of a plane that is substantially perpendicular to the optical axis 216.

The image sensor 208 may be configured to capture an image of light incident upon the image sensor 208 (i.e., light such as light rays 210A and 210B that cross the aperture 202), and to provide data to a computing system (i.e., via an input/output interface) representing the captured image. The image sensor 208 may include a CMOS (complementary metal oxide semiconductor) sensor or a CCD (charge-coupled device) sensor, among other possibilities. The image sensor 208 may be aligned perpendicularly to the optical axis 216. As shown in FIG. 2A, the image sensor 208 may be mounted underneath a hole in the back internal surface 212, however in other examples the image sensor could be mounted on the back internal surface 212, within a cavity defined by the back internal surface 212 and the front internal surface 214, or flush with the back internal surface 212. Other locations are possible.

As shown in FIG. 2A, light rays 210A and 210B may travel in a downward direction and cross the aperture 202. After crossing the aperture 202, the light rays 210A and 210B may be reflected by the back internal surface 212 toward the front internal surface 214. The back internal surface 212 may be a continuous reflective surface or include a plurality of distinct reflectors angled to direct light toward the image sensor 208 and/or the front internal surface 214.

After the light rays 210A and 210B reflect off the back internal surface 212, the light rays 210A and 210B may travel toward the front internal surface 214. The front internal surface 214 may also be a continuous reflective surface or include a plurality of distinct reflectors angled to direct light toward the image sensor 208 and/or the back internal surface 212. The front internal surface 214, together with the back internal surface 212, may be structured so that the imaging system 200 functions as a "lens" with a focal length defined by structural characteristics of the back internal surface 212 and the front internal surface 214.

The light rays 210A and 210B may be reflected multiple times by the front internal surface 214 and the back internal surface 212 as the light rays 210A and 210B travel from the aperture 202 toward the image sensor 208. After a number of reflections off the front internal surface 214 and the back internal surface 212, the light rays 210A and 210B may become incident upon the image sensor 208. In this way, images of objects within a field of view of the imaging system 200 may be captured.

The inner perimeter 206 forms a radial boundary of the front external surface 215. The front external surface 215 may be reflective or opaque, but generally does not allow a substantial amount of light to pass through the front external surface 215. This ensures that for light to enter the cavity defined by the back internal surface 212 and the front internal surface 214, such light passes through the aperture 202 and does not impact the front external surface 215.

The optical axis 216 may define an axis of rotational symmetry (or other axis of symmetry) for the aperture 202, the outer perimeter 204, the inner perimeter 206, the image sensor 208, the back internal surface 212, and the front internal surface 214, or any reflectors that make up the back internal surface 212 and/or the front internal surface 214.

It should be noted that dimensions of the imaging system 200 in FIG. 2A may not be to scale, and are for illustrative purposes only. It should also be noted that any depicted angles and/or directions of refraction or reflection of light depicted in FIG. 2A are purely for illustrative purposes and are not necessarily to scale.

Figure 2B:
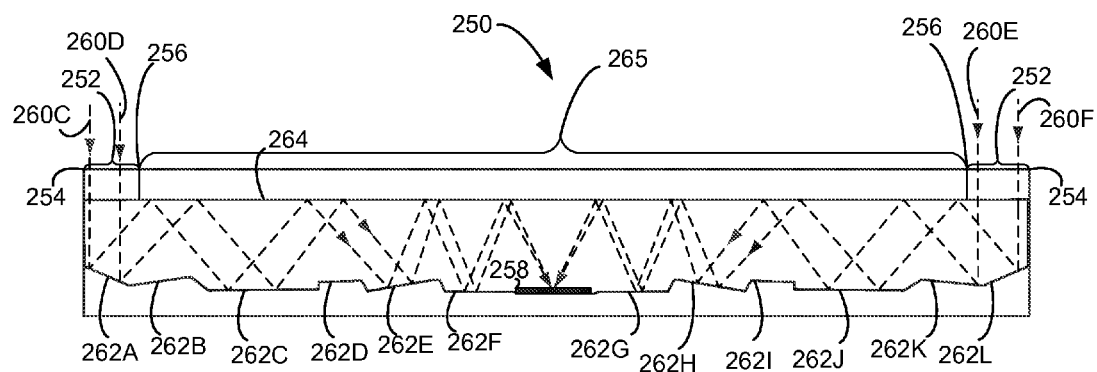
FIG. 2B illustrates a cross section of an example imaging system.

FIG. 2B illustrates a cross section of an example imaging system 250. FIG. 2B includes the imaging system 250, an aperture 252, an outer perimeter 254, an inner perimeter 256, an image sensor 258, light rays 260C, 260D, 260E, and 260F, a plurality of back internal reflectors 262A, 262B, 262C, 262D, 262E, 262F, 262G, 262H, 262I, 262J, 262K, and 262L, a front internal reflector 264, and a front exterior surface 265.

The aperture 252 may be a ring-shaped or annular gap or opening similar to the aperture 202 described above with regard to FIG. 2A. The aperture 252 may be defined or bounded by the inner perimeter 256 and the outer perimeter 254.

As shown in FIG. 2B, light rays 260C and 260D may cross the aperture 252 and become incident upon the back internal reflector 262A. The back internal reflector 262A may reflect the light rays 260C and 260D to be incident upon the front internal reflector 264. Then, the front internal reflector 264 may reflect the light rays 260C and 260D to be incident upon the back internal reflector 262C. Next, the back internal reflector 262C may reflect the light rays 260C and 260D to be incident again upon the front internal reflector 264. Then, the front internal reflector 264 may reflect the light rays 260C and 260D to be incident upon the back internal reflector 262E. Next, the back internal reflector 262E may reflect the light rays 260C and 260D to be incident yet again upon the front internal reflector 264. Then, the front internal reflector 264 may reflect the light rays 260C and 260D to be incident upon the back internal reflector 262F. Next, the back internal reflector 262F may reflect the light rays 260C and 260D to be incident yet again upon the front internal reflector 264. Finally, the front internal reflector 264 may reflect the light rays 260C and 260D to be incident upon the image sensor 258. In other examples, the back internal reflectors 262B and 262D may reflect light rays (indirectly) toward the image sensor 258 as well.

Similar to the light rays 260C and 260D, after the light rays 260E and 260F cross the aperture 252 the light rays 260E and 260F may be directed to the image sensor 258 by the front internal reflector 264 and/or the back internal reflectors 262G-L.

The inner perimeter 256 forms a radial boundary of the front external surface 265. The front external surface 265 may be reflective or opaque, but generally does not allow a substantial amount of light to pass through the front external surface 265. For light to enter a cavity defined by the back internal reflectors 262A-L and the front internal surface 264, such light generally passes through the aperture 252 and does not impact the front external surface 265.

Figure 3A:
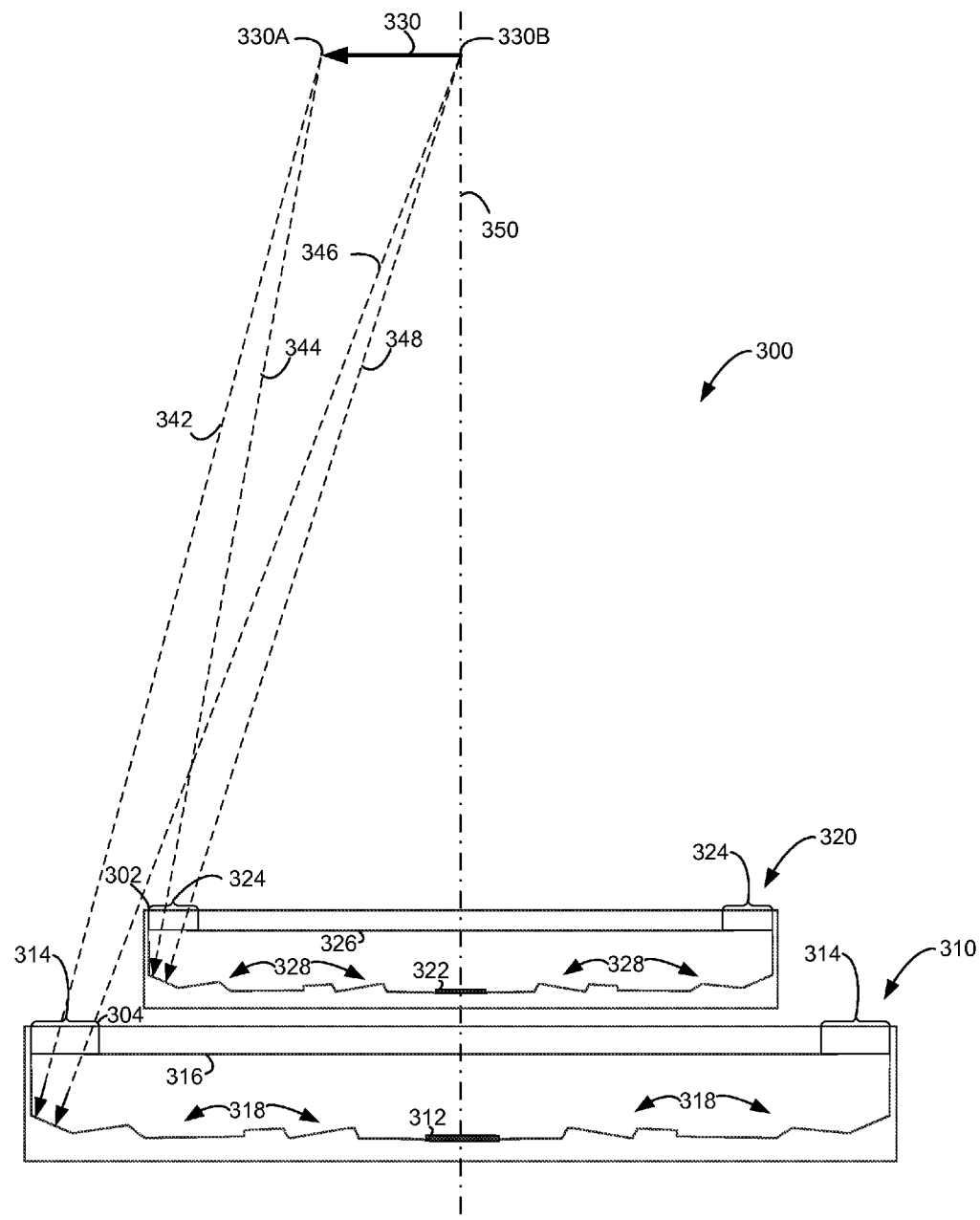
FIG. 3A illustrates a cross section of an example composite imaging system.

FIG. 3A illustrates a cross section of an example composite imaging system 300. A first imaging system 310 of the composite imaging system 300 includes a first image sensor 312, a first aperture 314, a first front internal reflector 316, and a first plurality of back internal reflectors 318. The composite imaging system 300 also includes a second imaging system 320 comprising a second image sensor 322, a second aperture 324, a second front internal reflector 326, and a second plurality of back internal reflectors 328. FIG. 3A further includes an object 330 with a first end 330A and a second end 330B, and light rays 342, 344, 346, and 348. Both the first and second image sensors 312 and 322 may be configured to capture light travelling downward relative to the optical axis 350. As described below, the first imaging system 310 and the second imaging system 320 may be configured to simultaneously capture images of objects from a common viewpoint (i.e., the optical axis 350) with little or no parallax disparity.

It should be noted that dimensions of the composite imaging system 300 or the object 330 represented in FIG. 3A may not be to scale, and are for illustrative purposes only. It should also be noted that any depicted angles and/or directions of refraction or reflection depicted in FIG. 3A are purely for illustrative purposes and are not necessarily to scale.

The optical axis 350 may define an axis of rotational symmetry (or other axis of symmetry) for the image sensors 312 and 322, the apertures 314 and 324, the front internal reflectors 326 and 316, the first and second pluralities of back internal reflectors 318 and 328, and the composite imaging system 300 as a whole.

The first imaging system 310 comprising the first image sensor 312, the first aperture 314, the first front internal reflector 316, and the first plurality of back internal reflectors 318, may be configured to capture images of the object 330. For example, the light ray 342 may travel from the first end 330A of the object 330, past the second imaging system 320, through the first aperture 314, and be reflected by a reflector of the first plurality of back internal reflectors 318 toward the first front internal reflector 316. The light ray 342 may further be reflected by the first front internal reflector 316 and the first plurality of back internal reflectors 318 as described above in regard to FIGS. 2A and 2B to become incident upon the first image sensor 312.

The light ray 346 may travel from the second end 330B of the object 330, past the second imaging system 320, through the first aperture 314, and be reflected by a reflector of the first plurality of back internal reflectors 318 toward the first front internal reflector 316. The light ray 346 may further be reflected by the first front internal reflector 316 and the first plurality of back internal reflectors 318 as described above in regard to FIGS. 2A and 2B to become incident upon the first image sensor 312. As light rays 342 and 346 (and other light rays representing the object 330) become incident upon the first image sensor 312, a real image of the object 330 may be formed upon the first image sensor 312. Rays of light that originate from a point on the optical axis 350 and travel past the second imaging system 320 (such as light rays 342 and 346) may be directed by components of the first imaging system 310 to a point on the first image sensor 312 that is on the optical axis 350.

The second imaging system 320 comprising the second image sensor 322, the second aperture 324, the second front internal reflector 326, and the second plurality of back internal reflectors 328, may be configured to capture images of the object 330. A back surface of the second imaging system 320 may be mounted to a front surface of the first imaging system 310 so that the second imaging system 320 is outside a field of view of the first imaging system 310. That is, the second imaging system 320 may be sized and mounted such that it is impossible for light originating from or reflected by the second imaging system 320 to cross the first aperture 314 and reach the first image sensor 312. For example, an inner perimeter 304 of the first imaging system 310 may be larger than an outer perimeter 302 of the second imaging system 320.

The light ray 344 may travel from the first end 330A of the object 330 through the second aperture 324 and be reflected by a reflector of the second plurality of back internal reflectors 328 toward the second front internal reflector 326. The light ray 344 may further be reflected by the second front internal reflector 326 and the second plurality of back internal reflectors 328 as described above in regard to FIGS. 2A and 2B to become incident upon the second image sensor 322.

The light ray 348 may travel from the second end 330B of the object 330, through the second aperture 324, and be reflected by a reflector of the second plurality of back internal reflectors 328 toward the second front internal reflector 326. The light ray 348 may further be reflected by the second front internal reflector 326 and the second plurality of back internal reflectors 328 as described above in regard to FIGS. 2A and 2B to become incident upon the second image sensor 322. As light rays 344 and 348 (and other light rays representing the object 330) become incident upon the second image sensor 322, a real image of the object 330 may be formed upon the second image sensor 322. In some examples, the second imaging system 320 could be any sort of imaging system (i.e., possibly not include an origami lens as shown in FIG. 3A).

The image sensors 312 and 322 may be aligned perpendicularly to the optical axis 350 and face a common direction (upward in this example). In this example the first image sensor 312 is located below the second image sensor 322 along the optical axis 350. In one example, the first image sensor 312 may be a black-and-white image sensor (i.e., not operably coupled to a color filter) while the second image sensor 322 may be a color image sensor (e.g., operably coupled to a mosaic or Bayer color filter). Since the color filter may attenuate an intensity of light that is detected by pixels of the second image sensor 322, it may be beneficial to use color information detected by the second image sensor 322 and brightness information detected by the first image sensor 312 to form a composite image with a high level of detail in both brightness and color. In another example, the first image sensor 312 could be a color image sensor and the second image sensor 322 could be a black-and-white image sensor.

As another example, the first image sensor 312 could have a low pixel density (i.e., large pixels) with a resultant high light sensitivity and the second image sensor 322 may have a high pixel density and resultant low light sensitivity. Here, the first image sensor 312 could be used to capture brightness information and the second image sensor 322 could be used to capture better spatial resolution information to form a composite image with images simultaneously respectively captured by the first image sensor 312 and the second image sensor 322. In another example, the first image sensor 312 may have a high pixel density and the second image sensor 322 could have a low pixel density.

In some examples, it may be useful for the first imaging system 310 and the second imaging system 320 to have different depths of field. For example, the first aperture 314 (or a corresponding entrance pupil) may be wider or narrower than the second aperture 324 (or a corresponding entrance pupil). An entrance pupil of an imaging system may represent a "virtual aperture" coplanar with an aperture of the imaging system that is wider or narrower than the aperture based on optical characteristics of the imaging system (e.g., a focal length). In this case, the first aperture 314 (or an entrance pupil defined by the first aperture 314 and an effective focal length of the first imaging system 310) may be wider or narrower than the second aperture 324 (or an entrance pupil defined by the second aperture 324 and an effective focal length of the second imaging system 320). In another example, it may be useful for the first imaging system 310 and the second imaging system 320 to have substantially equally sized and shaped entrance pupils when measured at each imaging system's respective aperture plane.

Or, it may be useful for the first imaging system 310 to have a narrower or a wider field of view than the second imaging system 320, in which case the first front internal reflector 316 and the first plurality of back reflectors 318 may be configured so that the first imaging system 310 has a shorter or a longer focal length (i.e., degree of zoom) than the second imaging system 320.

Note that positioning the first aperture 314 at a perimeter region of the first imaging system 310 may allow for almost any type of second imaging system to be stacked on top of or in front of the first imaging system 310, such that the optical axes of the first and second imaging systems are aligned. For example, FIG. 3B shows a second imaging system with a lens that receives light through an aperture that is centered on the optical axis.

Figure 3B:
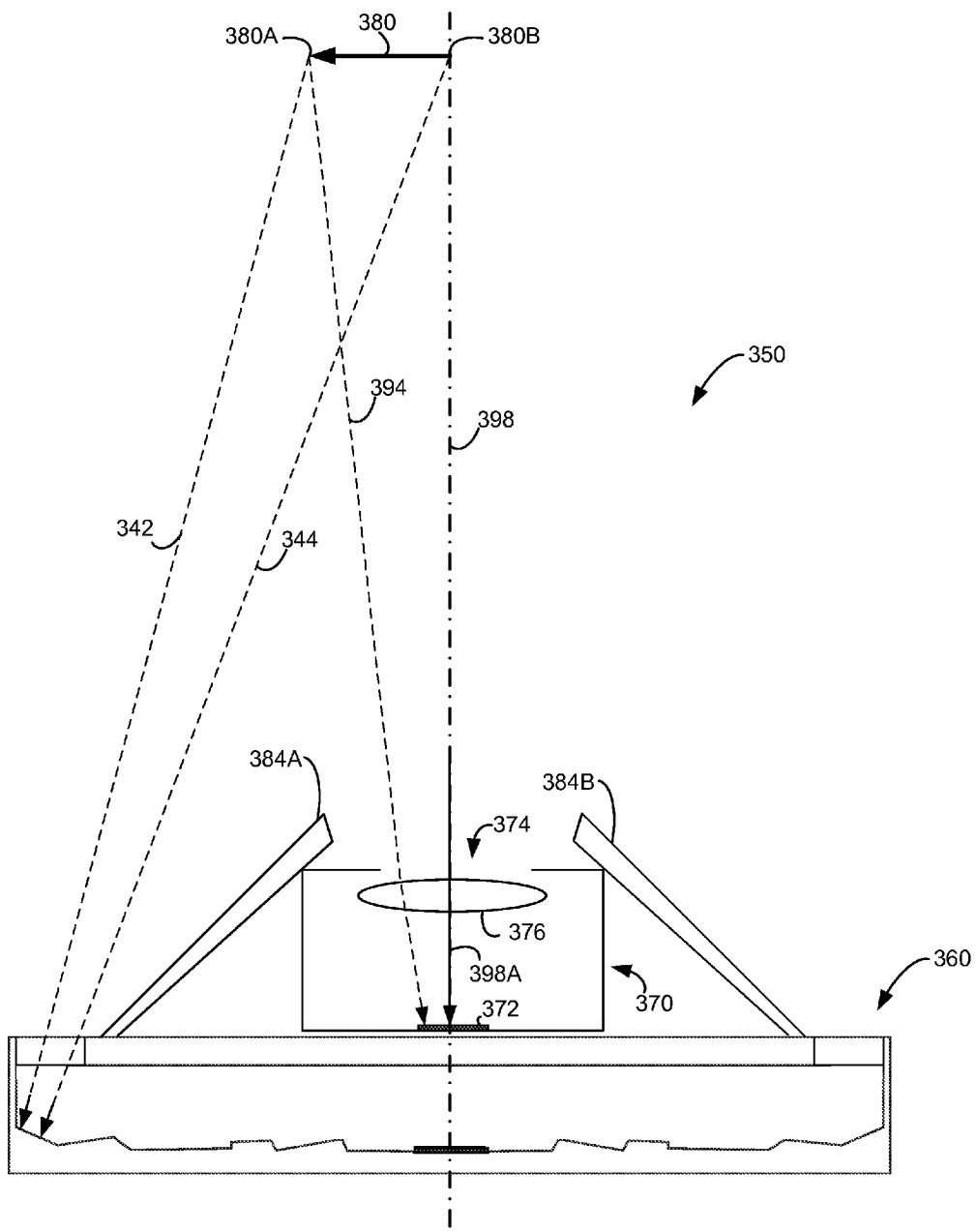
FIG. 3B illustrates a cross section of another example composite imaging system.

FIG. 3B depicts a composite imaging system 350, including a first imaging system 360 and a second imaging system 370. The first imaging system 360 may include an attachment module comprising a first clip 384A and a second clip 384B. The second imaging system 370 may include an image sensor 372, an aperture 374, and a lens 376.

The second imaging system 370 may be configured to capture an image of the object 380 with a field of view being centered on the optical axis 398. The first imaging system 360 may also be configured to capture an image of the object 380 with a field of view of the image being centered on the optical axis 398.

For example, a light ray 394 and a light ray 398A (travelling parallel to the optical axis 398) may travel respectively from a first end 380A and a second end 380B of the object 380. The light ray 394 and the light ray 398A may pass through the aperture 374, be refracted by the lens 376, and become incident upon the image sensor 372 to form an image of the object 380 upon the image sensor 372.

The first imaging system 360 may include an attachment module comprising the first clip 384A and the second clip 384B. The first clip 384A may be configured to restrain the second imaging system 370 against the first imaging system 360 at a first side of the second imaging system 370 and the second clip 384B may be configured to restrain the second imaging system 370 against the first imaging system 360 at a second side of the second imaging system 370. The clips 384A and 384B may include a tension spring that allows the clips 384A and 384B to open to clasp a surface of the second imaging system 370 and to apply a restraining force to the surface of the second imaging system 370. The clips 384A and 384B may have any size, shape, or location upon the first imaging system 360 that is suitable for restraining various sizes of second imaging systems against the first imaging system 360.

Further, FIG. 3B includes attachment features, which provide for modular composite imaging system embodiments. The attachment features, which are clips 384A and 384B in the illustrated embodiment, allow the composite imaging system 350 to be modular. That is, different second imaging systems 370 with various types of lenses could be interchangeably attached on top or in front of the first imaging system 360 (e.g., a first imaging system including an origami lens). For example, a user could interchangeably attach to the first imaging system 360 a second imaging system including a macro lens, a wide-angle lens, a portrait lens, a fisheye lens, and/or lenses with different filters, among other possibilities, on top of the first imaging system 360. Note that the clips 384A and 384B in the illustrated embodiment are but one example of attachment features. In other implementations, magnetic, adhesive, or interlocking attachment features could be used. More generally, any type attachment features could be incorporated, so long as it allows for a second imaging system, lens, and/or image sensor structure to be removably attached to the first imaging system. Further, more or less than two attachment features are possible.

Figure 4A:
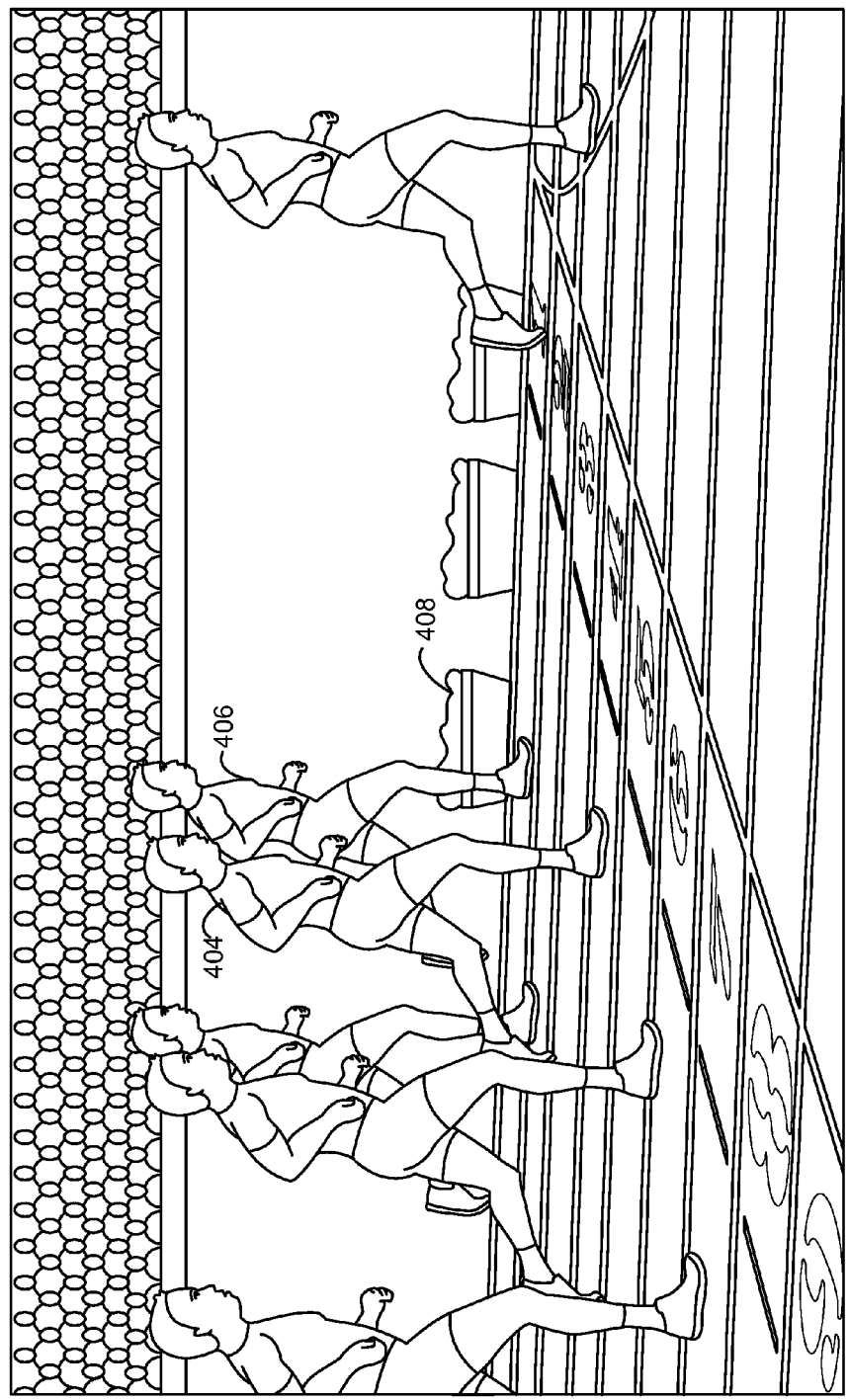
FIG. 4A illustrates an image captured by a first imaging system of a composite image system.
Figure 4B:
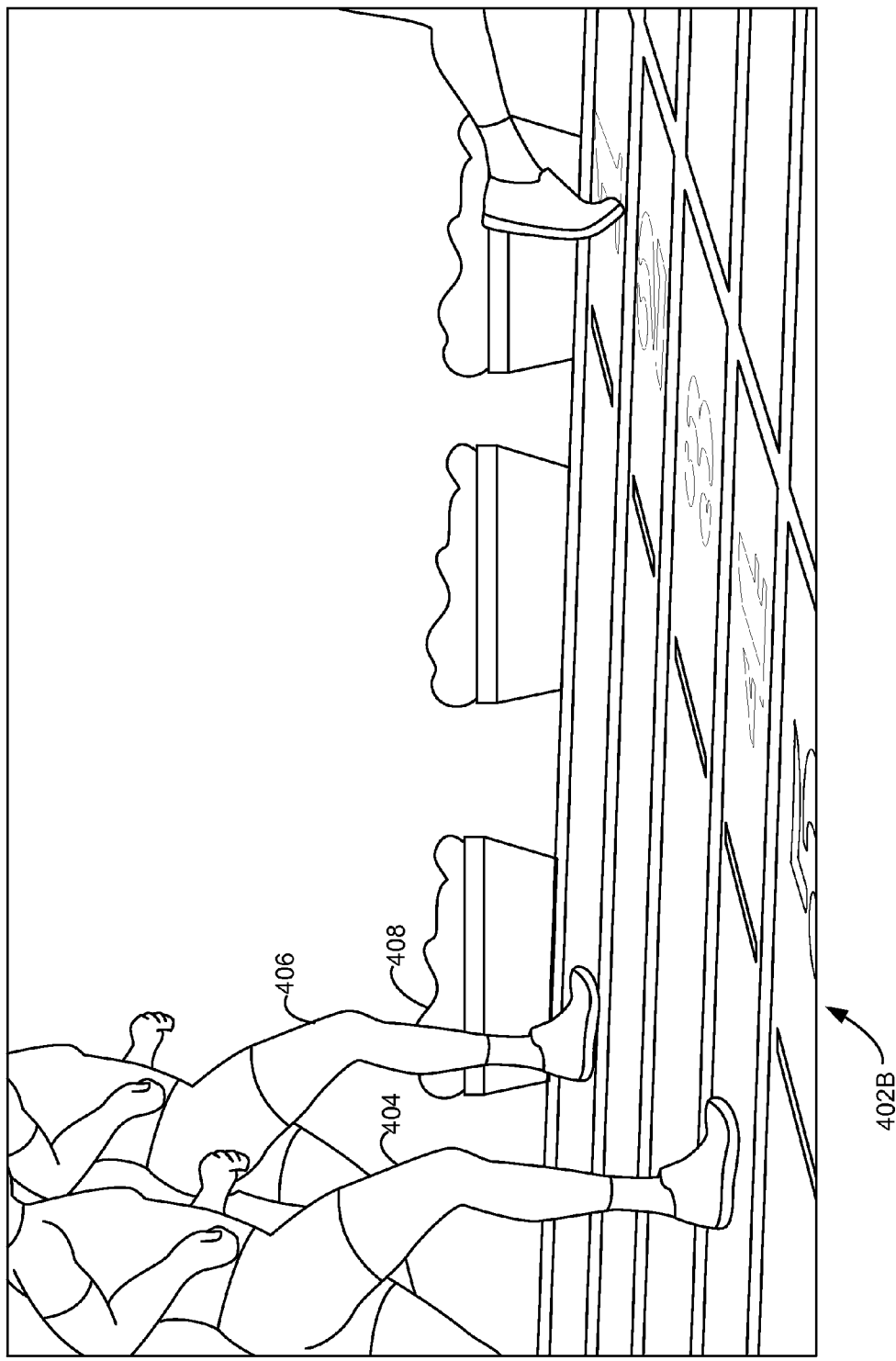
FIG. 4B illustrates an image captured by a second imaging system of a composite image system.

FIGS. 4A and 4B illustrate images captured by respective imaging systems. In FIG. 4A, image 402A could be an image captured by the first imaging system 310 or 360 respectively of FIGS. 3A and 3B. Accordingly, the image 402B of FIG. 4B could be an image simultaneously captured by the second imaging system 320 or 370 respectively of FIGS. 3A and 3B.

Alternatively, the image 402A could be captured by the second imaging system 320 or 370 respectively of FIGS. 3A and 3B and the image 402B could be captured by the first imaging system 310 or 360 respectively of FIGS. 3A and 3B.

As shown in FIGS. 4A and 4B, the first imaging system 310 and the second imaging system 320 depicted in FIG. 3A may be configured to simultaneously capture an image of light sources or light reflecting off objects, from a common viewpoint and with very little (or zero) parallax disparity. For example, the first object 404 (e.g., a first runner), the second object 406 (e.g., a second runner), and the third object 408 (e.g., a flower pot) may have the same apparent spatial relationships in both images 402A and 402B. For instance, the first object 404 may appear to be in front of the second object 406, and the second object 406 may appear to be in front of the third object 408. Also, the objects may appear to overlap at the same places in both images 402A and 402B. For instance, the first runner's right leg (i.e., first object 404) may appear to be in front of the second runner's left leg (i.e., the second object 406). Also, the second runner's right leg (i.e., the second object 406) may appear to be in front of the flower pot (i.e., the third object 408). It should be noted that the images 402A and 402B depict a common viewpoint (i.e., both images share a common optical axis).

Figure 5:
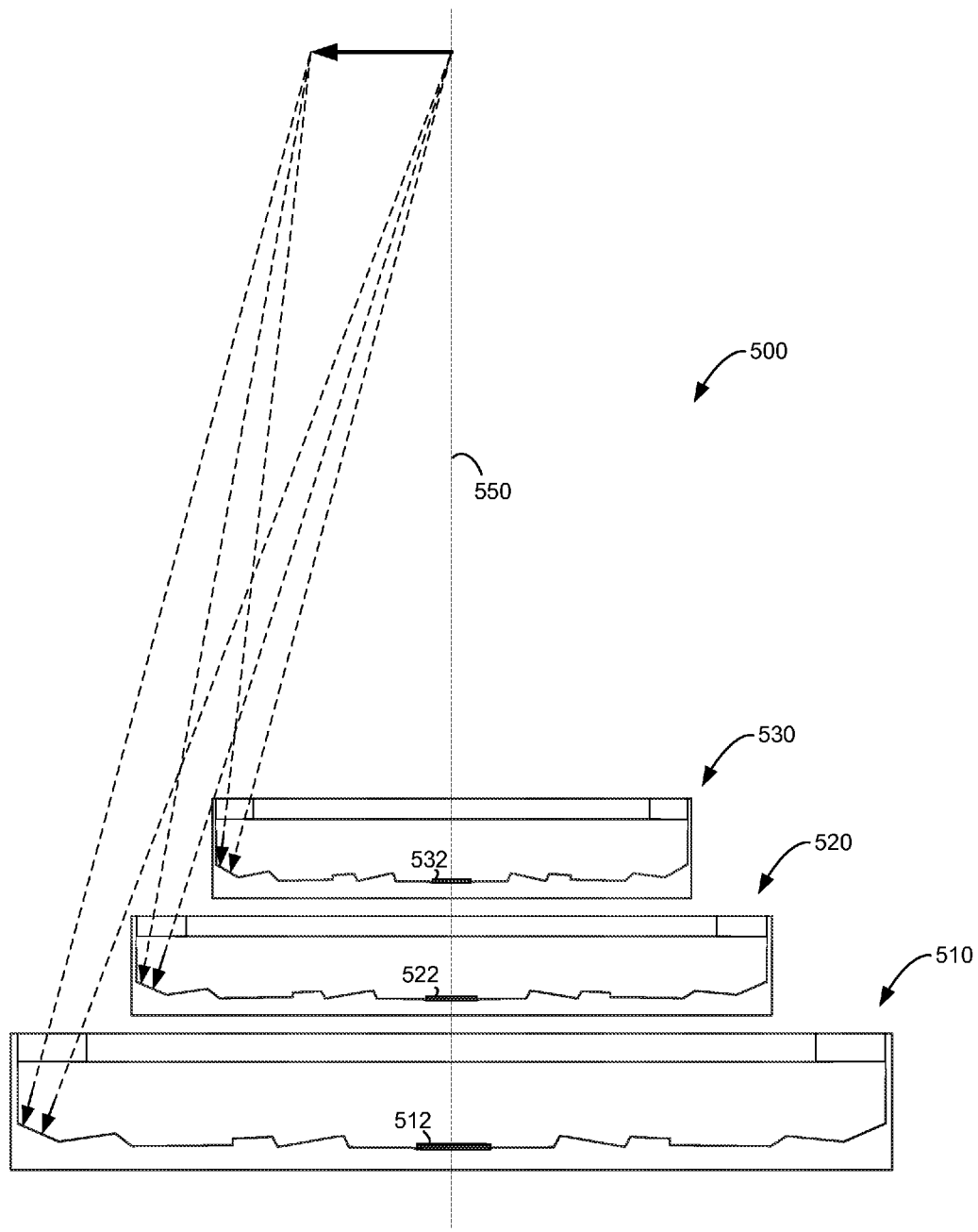
FIG. 5 illustrates a cross section of another example composite imaging system.

FIG. 5 illustrates a cross section of another example composite imaging system. FIG. 5 includes a first imaging system 510 including a first image sensor 512, a second imaging system 520 including a second image sensor 522, and a third imaging system 530 including a third image sensor 532. As described below, the first imaging system 510, the second imaging system 520, and the third imaging system 530 may be configured to simultaneously capture images of objects from a common viewpoint with little or no parallax disparity since the imaging systems may be arranged around a common optical axis 550.

The first imaging system 510, the second imaging system 520, and the third imaging system 530 may function similarly and have similar structure to the first imaging system 310 or the second imaging system 320 of FIG. 3A, or the imaging systems 200 and 250 of FIGS. 2A and 2B, respectively.

In one example, the first image sensor 512 may be operably coupled to a first passband filter (not shown) having a first transmission band, the second image sensor 522 may be operably coupled to a second passband filter (not shown) having a second transmission band, and the third image sensor 532 may be operably coupled to a third passband filter (not shown) having a third transmission band. The first, second, and third transmission bands may respectively correspond to primary colors such as red, green, and blue. In other examples, any of the first, second, or third image sensors 512, 522, and 532 could be operably coupled to passband filters with passbands corresponding to any one of the primary colors such as red ($\lambda \approx 620\text{-}750$ nm), green ($\lambda \approx 495\text{-}570$ nm), and blue ($\lambda \approx 450\text{-}495$ nm). The composite imaging system 500 could be used to simultaneously (i) use the first imaging system 510 to capture an image of red wavelengths representing an object, (ii) use the second imaging system 520 to capture an image of green wavelengths representing the object, and (iii) use the third imaging system 530 to capture an image of blue wavelengths representing the object. These images could be combined into a composite image with higher color resolution, less color crosstalk, and better brightness and/or contrast than an image captured using a single image sensor with a traditional mosaic (e.g., Bayer) filter.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A composite imaging system comprising:
   a first imaging system comprising:
     a first image sensor;
     a first aperture anterior to the first image sensor, wherein the first aperture (i) is defined by an inner perimeter and an outer perimeter and (ii) defines, at least in part, a field of view of the first imaging system; and
     a plurality of reflectors posterior to the first aperture that are configured to redirect light that crosses the first aperture to the first image sensor, wherein the first image sensor, the first aperture, and the plurality of reflectors are arranged around a common optical axis; and
   a second imaging system arranged substantially anterior to the first imaging system, the second imaging system comprising:
     a second image sensor; and
     a second aperture located anterior to the second image sensor, wherein the second aperture defines, at least in part, a field of view of the second imaging system, wherein the second aperture and the second image sensor are arranged around the common optical axis, and wherein the second imaging system is arranged such that the second imaging system is outside the field of view of the first imaging system.

2. The composite imaging system of claim 1, wherein a front surface of the first imaging system is coupled to a back surface of the second imaging system.

3. The composite imaging system of claim 1, wherein the inner perimeter of the first aperture is larger than a perimeter of the second aperture.

4. The composite imaging system of claim 1, wherein the composite imaging system is arranged so that at least some light emitted by a light source on the common optical axis travels past the second imaging system, then crosses the first aperture and is redirected to the first image sensor by the plurality of reflectors.

5. The composite imaging system of claim 1, wherein a size and a shape of an entrance pupil of the first imaging system is respectively substantially equal to a size and a shape of an entrance pupil of the second imaging system.

6. The composite imaging system of claim 1, wherein the field of view of the first imaging system and the field of view of the second imaging system are substantially centered on the common optical axis.

7. The composite imaging system of claim 1, wherein the first imaging system comprises an attachment module configured to restrain the second imaging system against the first imaging system.

8. The composite imaging system of claim 7, wherein the attachment module comprises:
   a first clip configured to restrain the second imaging system against the first imaging system at a first side of the second imaging system; and
   a second clip configured to restrain the second imaging system against the first imaging system at a second side of the second imaging system.

9. A composite imaging system comprising:
   a first imaging system comprising:
     a first image sensor;
     a first aperture anterior to the first image sensor, wherein the first aperture (i) is defined by an inner perimeter and an outer perimeter and (ii) defines, at least in part, a field of view of the first imaging system; and
     a first plurality of reflectors posterior to the first aperture that are configured to redirect light that crosses the first aperture to the first image sensor, wherein the first image sensor, the first aperture, and the first plurality of reflectors are arranged around a common optical axis; and
   a second imaging system arranged substantially anterior to the first imaging system, the second imaging system comprising:
     a second image sensor;
     a second aperture anterior to the second image sensor, wherein the second aperture (i) is defined by an inner perimeter and an outer perimeter and (ii) defines, at least in part, a field of view of the second imaging system; and
     a second plurality of reflectors posterior to the second aperture configured to redirect light that crosses the second aperture to the second image sensor, wherein the second image sensor, the second aperture, and the second plurality of reflectors are arranged around the common optical axis, and wherein the second imaging system is arranged such that the second imaging system is outside the field of view of the first imaging system.

10. The composite imaging system of claim 9, wherein a front surface of the first imaging system is coupled to a back surface of the second imaging system.

11. The composite imaging system of claim 9, wherein the inner perimeter of the first aperture is larger than the outer perimeter of the second aperture.

12. The composite imaging system of claim 9, wherein the field of view of the first imaging system and the field of view of the second imaging system are substantially centered on the common optical axis.

13. The composite imaging system of claim 9, wherein the composite imaging system is arranged so that at least some light emitted by a light source on the common optical axis travels past the second imaging system, then crosses the first aperture and is redirected to the first image sensor by the first plurality of reflectors.

14. The composite imaging system of claim 9, wherein a size and a shape of an entrance pupil of the first imaging system is respectively substantially equal to a size and a shape of an entrance pupil of the second imaging system.

15. The composite imaging system of claim 9, wherein one of the first and second image sensors is a color image sensor and one of the first and second image sensors is a black and white image sensor.

16. The composite imaging system of claim 9, wherein a pixel density of the first image sensor is unequal to a pixel density of the second image sensor.

17. The composite imaging system of claim 9, wherein a width of the first aperture is unequal to a width of the second aperture.

18. The composite imaging system of claim 9, wherein a focal length of the first imaging system is unequal to a focal length of the second imaging system.

19. The composite imaging system of claim 9, further comprising a third imaging system arranged substantially anterior to the second imaging system, wherein the third imaging system comprises:
 a third image sensor; and
 a third aperture anterior to the third image sensor, wherein the third aperture defines, at least in part, a field of view of the third imaging system, wherein the third aperture and the third image sensor are arranged around the common optical axis, wherein the third imaging system is arranged such that the third imaging system is outside the field of view of the first imaging system and the field of view of the second imaging system;
wherein the composite imaging system further comprises:
 a first passband filter having a first transmission band, wherein the first passband filter is operably coupled to the first image sensor;
 a second passband filter having a second transmission band, wherein the second passband filter is operably coupled to the second image sensor; and
 a third passband filter having a third transmission band, wherein the third passband filter is operably coupled to the third image sensor, wherein the first, second, and third transmission bands respectfully represent primary colors.

20. The composite imaging system of claim 19, wherein one of the first, second, or third passband filters is a red passband filter, wherein one of the first, second, or third passband filters is a blue passband filter, and wherein one of the first, second, or third passband filters is a green passband filter.

* * * * *